United States Patent [19]

Yasuno et al.

[11] Patent Number: 5,019,985
[45] Date of Patent: May 28, 1991

[54] ANTI-SKID BRAKE CONTROL SYSTEM FOR AUTOMOTIVE VEHICLE, PARTICULARLY FOR VEHICLE HAVING SELECTIVE TWO-WHEEL AND FOUR-WHEEL DRIVE POWER TRAIN

[75] Inventors: Yoshiki Yasuno, Kanagawa; Yasuki Ishikawa, Tokyo; Akira Higashimata; Takeshi Fujishiro, both of Kanagawa, all of Japan

[73] Assignee: Nissan Motor Company, Limited, Yokohama, Japan

[21] Appl. No.: 330,620

[22] Filed: Mar. 30, 1989

[30] Foreign Application Priority Data

Mar. 31, 1988 [JP] Japan .................. 63-78563

[51] Int. Cl.$^5$ ............... G06F 7/70; G06F 15/50; B60T 8/86; B60K 17/356
[52] U.S. Cl. ............... 364/426.02; 364/424.1; 364/426.01; 303/93; 303/97; 180/244
[58] Field of Search .............. 303/93, 94, 97, 99, 303/107; 180/197, 233, 244, 247; 364/426.01, 426.02, 424.1

[56] References Cited

U.S. PATENT DOCUMENTS

| | | |
|---|---|---|
| 4,384,330 | 5/1983 | Matsuda et al. |
| 4,392,202 | 7/1983 | Matsuda . |
| 4,408,290 | 10/1983 | Kubo et al. . |
| 4,430,714 | 2/1984 | Matsuda et al. . |
| 4,511,014 | 4/1985 | Makita ................. 180/233 |
| 4,538,700 | 9/1985 | Suzuki ................. 180/197 |
| 4,569,560 | 2/1986 | Kubo . |
| 4,597,052 | 6/1986 | Matsuda . |
| 4,637,663 | 1/1987 | Matsuda . |
| 4,656,588 | 4/1987 | Kubo . |
| 4,660,146 | 4/1987 | Kubo . |
| 4,662,686 | 5/1987 | Matsuda . |
| 4,663,715 | 5/1987 | Kubo . |
| 4,663,716 | 5/1987 | Kubo . |
| 4,665,491 | 5/1987 | Kubo . |
| 4,667,176 | 5/1987 | Matsuda . |
| 4,669,045 | 5/1987 | Kubo . |
| 4,669,046 | 5/1987 | Kubo . |
| 4,674,049 | 6/1987 | Kubo . |
| 4,674,050 | 6/1987 | Kubo . |
| 4,679,146 | 7/1987 | Kubo . |
| 4,680,713 | 7/1987 | Kubo . |
| 4,680,714 | 7/1987 | Kubo . |
| 4,682,295 | 7/1987 | Kubo . |
| 4,683,537 | 7/1987 | Matsuda . |
| 4,704,684 | 11/1987 | Kubo . |
| 4,718,013 | 1/1988 | Kubo . |
| 4,753,312 | 6/1988 | Burgdorf et al. ........... 180/197 |
| 4,762,276 | 8/1988 | Matsubara . |
| 4,763,263 | 8/1988 | Leiber. ............. 364/426.03 |
| 4,763,912 | 8/1988 | Matsuda . |
| 4,771,850 | 9/1988 | Matsuda . |
| 4,780,818 | 10/1988 | Kubo . |
| 4,809,182 | 2/1989 | Matsuda . |
| 4,846,298 | 7/1989 | Naito ............. 364/424.1 X |
| 4,849,891 | 7/1989 | Krohn et al. ........ 364/426.03 |

FOREIGN PATENT DOCUMENTS

| | | |
|---|---|---|
| 947399 | 5/1974 | Canada . |
| 2102294 | 7/1971 | Fed. Rep. of Germany . |
| 3712053 | 10/1987 | Fed. Rep. of Germany . |
| 3721626 | 1/1988 | Fed. Rep. of Germany . |
| 3638665 | 5/1988 | Fed. Rep. of Germany . |

OTHER PUBLICATIONS

Bosch Technische Berichte, vol. 7, Par 2, pp. 78–83.

Primary Examiner—Parshotam S. Lall
Assistant Examiner—E. J. Pipala
Attorney, Agent, or Firm—Foley & Lardner

[57] ABSTRACT

An anti-skid brake control system is associated with a control system for a power train which controls power train operation mode between a four-wheel drive mode, in which all four wheels are coupled with an automotive internal combustion engine to be distributed torque according to a controlled distribution ratio of an engine driving torque, and a two-wheel drive mode, in which two auxiliary driving wheels are disconnected from the engine to be free from engine driving torque and two driving wheels are connected to the engine to receive the engine driving torque. The anti-skid brake control system is so associated with the power train control system as to normally set the power train operation mode into the two-wheel drive mode during active state of anti-skid brake control, and to set the power train operation mode into the four-wheel driven mode in response to wheel slippage at the primary driving wheels greater than a predetermined threshold value.

18 Claims, 8 Drawing Sheets

ANTI-SKID BRAKE CONTROL SYSTEM FOR AUTOMOTIVE VEHICLE, PARTICULARLY FOR VEHICLE HAVING SELECTIVE TWO-WHEEL AND FOUR-WHEEL DRIVE POWER TRAIN

BACKGROUND OF THE INVENTION

1. Field of the Invention

The present invention relates generally to an anti-skid brake control system for an automotive vehicle, which prevents excess magnitude of wheel slippage due to locking of wheel and whereby provides optimum vehicular braking efficiency. More specifically, the invention relates to an anti-skid brake control system particularly adapted for a vehicle having a four-wheel drive power train which is selectively switchable between four-wheel drive mode and two-wheel drive mode.

2. Description of the Background Art

Japanese Patent First (unexamined) Publications (Tokkai) Showa 61-169361 and 61-295132 disclose anti-skid brake control systems for four-wheel drive type vehicles which have clutch mechanisms selectively switching operation mode of a power train between four-wheel drive mode and two (front)-wheel drive mode depending upon the vehicle driving conditions. In such prior proposed system, the anti-skid brake control system is so associated with a power train control system which switches the operation mode of the power train between the four-wheel drive mode and two-wheel drive mode, as to switch operation mode from four-wheel drive mode to two-wheel drive mode for assure projection of a vehicle body speed data based on wheel rotation speed of a wheel which is disconnected from power source, i.e. an automotive engine, during active state of the anti-skid brake control system.

As will be seen, the prior proposed system forcingly switches the power train operation mode from four-wheel drive mode to two-wheel drive mode irrespective of wheel slippage magnitude at a primary driving wheel which is constantly connected to the engine. In such layout, the wheel disconnected from the engine is free from the deceleration torque of the engine during active state of the anti-skid control. Namely, an engine braking torque is only active on the primary driving wheels. This implies that, because power distribution in the power train is 100 (%) : 0 (%) between the primary driving wheel and auxiliary driving wheel which is disconnected from the engine during active state of the anti-skid brake control, all of negative driving torque is distributed to the driving wheel. This negative driving torque, i.e. engine braking torque, tends to cause delay in recovery of wheel rotation speed after occurrence of excessive wheel slippage. This tendency becomes substantially higher at low friction road, such as a icy road, snow road and so forth. Delay of recovery of wheel rotation speed maintains the wheel slippage at excessive level for relatively long time so as to cause degradation of the vehicle drivability. In case that the primary driving wheel is rear-wheels, vehicle driving stability can be degraded. On the other hand, in case that the primary driving wheel is front-wheels, vehicle steering stability can be degraded.

SUMMARY OF THE INVENTION

Therefore, it is an object of the present invention to provide an anti-skid brake control system which can reduce lag in recovery of wheel rotation speed even in two-wheel drive mode for assuring driving stability and steering stability.

In order to accomplish aforementioned and other objects, an anti-skid brake control system, according to the present invention, is associated with a control system for a power train which controls power train operation mode between a four-wheel drive mode, in which all four wheels are coupled with an automotive internal combustion engine to be distributed controlled distribution ratio of an engine driving torque, and a two-wheel drive mode, in which two auxiliary driving wheels are disconnected from the engine to be free from engine driving torque and two primary driving wheels are connected to the engine to receive the engine driving torque. The anti-skid brake control system is so associated with the power train control system as to normally set the power train operation mode into the two-wheel drive mode during active state of anti-skid brake control, and to set the power train operation mode into the four-wheel driven mode in response to wheel slippage at the primary driving wheels greater than a predetermined threshold value. According to one aspect of the invention, a combination comprises:

a power train control system associated with an automotive internal combustion engine for distributing driving torque generated the engine to front and rear wheels, the power train control system being operative between a two-wheel drive mode for distributing driving torque to selected one of front and rear wheels and a four-wheel drive mode for distributing driving torque to all of front and rear wheels;

an anti-skid brake control system for controlling a braking pressure for maintaining a wheel slippage in the vicinity of a predetermined optimum level the anti-skid control system comprising:

- a braking circuit connecting a pressurized fluid source to a wheel cylinder for each of the front and rear wheels for building up braking pressure in the latter;
- a pressure control valve means, disposed in the braking circuit, for controlling braking pressure in the wheel cylinder, the pressure control valve means operable for increasing braking pressure in the wheel cylinder in a first mode and decreasing braking pressure in the wheel cylinder in a second mode;
- first sensor for monitoring rotation speed of associated one of the front and rear wheels for producing a wheel speed indicative signal;
- second means for deriving a wheel slippage on the basis of the wheel speed indicative signal and producing a wheel slippage data;
- third means for producing a first control signal for controlling operation mode of the pressure control valve means for switching operation mode between the first and second mode in order to maintain wheel slippage in the vicinity of the predetermined optimum value, on the basis of the wheel slippage data; and
- fourth means, active while the third means is active, for detecting wheel slippage greater than a predetermined wheel slippage criterion for producing a second control signal for controlling the power train control system to set the operation mode at the four-wheel driving mode.

According to another aspect of the invention, in a combination of an anti-skid brake control system for controlling a braking pressure for maintaining a wheel slippage in the vicinity of a predetermined optimum level and a power train control system for controlling power distribution for front and rear wheels and operable in a two-wheel drive mode for distributing an engine driving torque to one of the front and rear wheels and in a four wheel drive mode for distributing driving torque to both of the front and rear wheels, the anti-skid control system comprises:

a braking circuit connecting a pressurized fluid source to a wheel cylinder for each of the front and rear wheels for building up braking pressure in the latter;

a pressure control valve means, disposed in the braking circuit, for controlling braking pressure in the wheel cylinder, the pressure control valve means operable for increasing braking pressure in the wheel cylinder in a first mode and decreasing braking pressure in the wheel cylinder in a second mode;

first sensor for monitoring rotation speed of associated one of the front and rear wheels for producing a wheel speed indicative signal;

second means for deriving a wheel slippage on the basis of the wheel speed indicative signal and producing a wheel slippage data;

third means for producing a first control signal for controlling operation mode of the pressure control valve means for switching operation mode between the first and second mode in order to maintain wheel slippage in the vicinity of the predetermined optimum value, on the basis of the wheel slippage data; and fourth means, active while the third means is active, for detecting wheel slippage greater than a predetermined wheel slippage criterion for producing a second control signal for controlling the power train control system to set the operation mode at the four-wheel driving mode.

According to a further aspect of the invention, in a combination of an anti-skid brake control system for controlling a braking pressure for maintaining a wheel slippage in the vicinity of a predetermined optimum level and a power train control system for controlling power distribution for front and rear wheels and operable in a two-wheel drive mode for distributing an engine driving torque to one of the front and rear wheels and in a four wheel drive mode for distributing driving torque to both of the front and rear wheels, the anti-skid control system comprising:

a hydraulic circuit connecting a hydraulic pressure source to a wheel cylinder generating a braking pressure therein;

a pressure control valve means disposed in the hydraulic circuit, for operating to increase the braking pressure in the wheel cylinder in a first mode and to decrease the braking pressure in the wheel cylinder in a second mode;

a first sensor means for monitoring rotation speed of a vehicular wheel to which the wheel cylinder is associated to produce a wheel speed indicative signal;

a second sensor means for monitoring a longitudinal acceleration exerted on a vehicle body for producing a longitudinal acceleration indicative signal;

a first arithmetic means for providing a predetermined offset value to the longitudinal acceleration indicative signal and integrating the offset longitudinal acceleration indicative signal for deriving a wheel speed deceleration magnitude indicative data, and subtracting the wheel speed deceleration magnitude indicative data from an initial value which corresponds to a wheel speed indicative signal value at the beginning of each skid control cycle for deriving a vehicle body speed representative data; and a second arithmetic means for controlling the pressure control valve means in a first mode for placing the pressure control valve in the first position and in a second mode for placing the pressure control valve means in the second position, the second arithmetic means deriving a control signal for selecting the first and second mode on the basis of the wheel speed indicative signal and the vehicle body speed representative data so as to maintain a wheel slippage within a predetermined range, the second arithmetic means detecting wheel slippage greater than a predetermined wheel slippage criterion for producing a second control signal for controlling the power train control system to set the operation mode at the four-wheel driving mode.

The anti-skid brake control may further comprise a second sensor means for monitoring longitudinal acceleration exerted on a vehicle body and producing a longitudinal acceleration indicative signal, and the fourth means is responsive to the longitudinal acceleration indicative signal representative of the longitudinal acceleration greater than a predetermined longitudinal acceleration criterion for producing the second control signal for ordering the four-wheel driving mode of the power train control system. The fourth means derives a wheel acceleration and responsive to the wheel acceleration decreasing across a predetermined wheel deceleration threshold for initiating skid cycle for controlling operation mode of the pressure control valve means according to a predetermined schedule, and the fourth means operates in a normal arithmetic mode for deriving the vehicle body speed representative data to a value corresponding to the wheel speed indicative signal value and a skid control state arithmetic mode for deriving the vehicle body speed on the basis of the initial value and the integrated value of the offset longitudinal acceleration indicative value in the skid cycle. The fourth means derives a wheel acceleration and compared the wheel acceleration with a predetermined threshold value so as to select the normal arithmetic mode when the wheel acceleration is maintained greater than or equal to the threshold value and to select the skid control state arithmetic mode otherwise.

The first arithmetic means may operate in a normal arithmetic mode for deriving the vehicle body speed representative data to a value corresponding to the wheel speed indicative signal value and a skid control state arithmetic mode for deriving the vehicle body speed on the basis of the initial value and the integrated value of the offset longitudinal acceleration indicative value in the skid cycle. The first means derives a wheel acceleration and compared the wheel acceleration with a predetermined threshold value so as to select the normal arithmetic mode when the wheel acceleration is maintained greater than or equal to the threshold value and to select the skid control state arithmetic mode otherwise. The first means further compares the vehicle body speed representative data and the wheel speed indicative signal value so as to permit the normal arithmetic mode operation when the wheel speed indicative signal value is greater than or equal to the vehicle body speed representative data.

BRIEF DESCRIPTION OF THE DRAWINGS

The present invention will be understood more fully from the detailed description given herebelow and from the accompanying drawings of the preferred embodiment of the present invention, which, however, should not be limited to the invention to the specific embodiment as disclosed herebelow, but are for explanation and understanding only.

In the drawings.

DESCRIPTION OF THE PREFERRED EMBODIMENT

Figure 1:
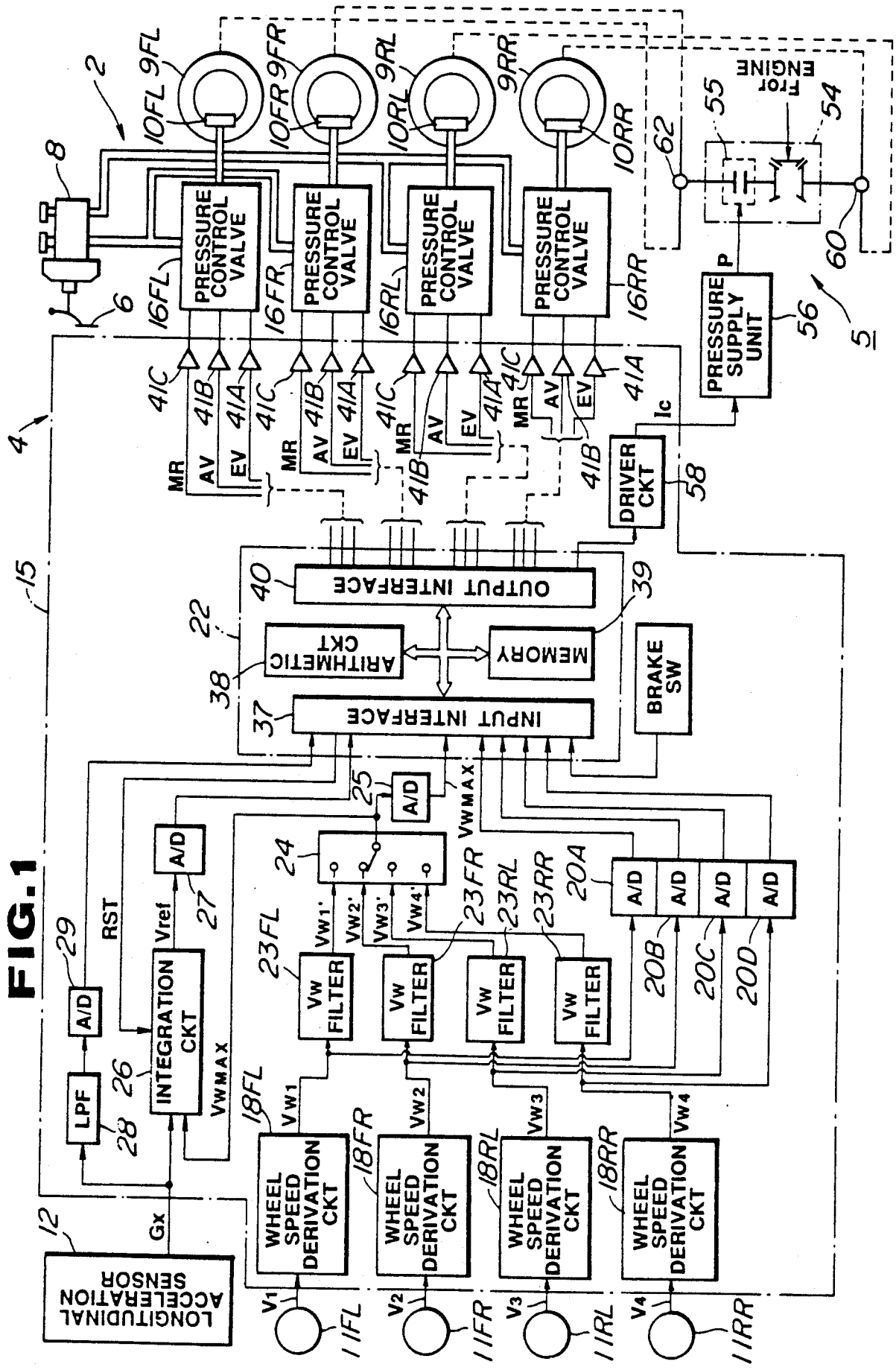
FIG. 1 is a block diagram of the preferred embodiment of an anti-skid brake control system, according to the present invention, which is associated with a power distribution control unit in a four-wheel drive power train.

Referring now to the drawings, particularly to FIG. 1, the preferred embodiment of an anti-skid brake control system, according to the present invention, is applied to an automotive vehicle having a power train for distributing driving torque of an automotive internal combustion engine selectively to front auxiliary driving wheels 9FL and 9FR and rear primary driving wheels 9RL and 9RR in four-wheel drive mode, and only to the rear primary wheels in two-wheel drive mode. The power train comprises a part-time four-wheel drive power train which can selectively switch between the two-wheel mode and the four-wheel drive mode depending upon the vehicle driving condition.

For respective front-left, front-right, rear-left and rear-right wheels 9FL, 9FR, 9RL and 9RR, hydraulic brake units having wheel cylinders 10FL, 10FR, 10RL and 10RR are provided. The wheel cylinders 10FL, 10FR, 10RL and 10RR form part of anti-skid brake control system 4 and designed to generate controlled magnitude of braking force in order for decelerating respectively associated wheels 9FL, 9FR, 9RL and 9RR. As set forth above, the anti-skid brake control system 4 is associated with a power train control system 5 for controlling distribution of the engine driving torque to the front and rear wheels 9FL, 9FR, 9RL and 9RR.

As is well known, the vehicle is provided with a vehicular hydraulic brake system 2 includes a brake pedal 6 which is mechanically connected to a master cylinder 8. The master cylinder 8 has two independent ports respectively connected to wheel cylinders 10FL, 10FR, 10RL and 10RR of front and rear wheels 9FL, 9FR, 9RL and 9RR via respectively independent hydraulic circuits. Pressure control valves 16FL, 16FR, 16RL and 16RR are provided in the hydraulic circuits for controlling supply of hydraulic working fluid for respective wheel cylinders 10FL, 10FR, 10RL and 10RR for adjusting braking pressure to be generated in respective wheel cylinders.

The pressure control valves 16FL, 16FR, 16RL and 16RR are connected to an anti-skid brake control unit 15. The anti-skid brake control unit 15 is connected to wheel speed sensors 11FL, 11FR, 11RL and 11RR respectively associated with front-left, front-right, rear-left and rear-right wheels 9FL, 9FR, 9RL and 9RR for monitoring rotation speed of respectively associated wheels. In general, each of the wheel speed sensors 11FL, 11FR, 11RL and 11RR comprises a rotor for rotating with the associated one of the wheels 9FL, 9FR, 9RL and 9RR, a plurality of notchings formed on the outer circumference of the rotor, and a magnetoelectric or optoelectric proximity sensor for detecting respective notchings for generating alternating current form frequency signal. Such frequency signal has a frequency proportional to the rotation speed of the associated wheel. The frequency signals generated by the wheel speed sensors 11FL, 11FR, 11RL and 11RR will be hereafter referred to as "wheel speed indicative signals $v_1$, $v_2$, $v_3$ and $v_4$". The anti-skid brake control unit 15 is also connected to a longitudinal acceleration sensor 12 which monitors longitudinal acceleration exerted on the vehicle body and produces a longitudinal acceleration indicative signal Gx. The longitudinal acceleration indicative signal Gx produced by the longitudinal acceleration sensor 12 is analog signal having a signal level variable depending upon the longitudinal acceleration exerted on the vehicle body. The value of the longitudinal acceleration indicative signal Gx is positive when the longitudinal acceleration exerted on the vehicle body is negative, i.e. decelerating, and is negative when the longitudinal acceleration exerted on the vehicle body is positive, i.e. accelerating.

The anti-skid brake control unit 15 has wheel speed derivation circuit 18FL, 18FR, 18RL and 18RR respectively connected to the wheel speed sensors 11FL, 11FR, 11RL and 11RR to receive the wheel speed indicative signals $v_1$, $v_2$, $v_3$ and $v_4$. Respective wheel speed derivation circuit 18FL, 18FR, 18RL and 18RR performs frequency-to-voltage (F/V) conversion to generate a wheel speed indicative voltage signals $Vw_1$, $Vw_2$, $Vw_3$ and $Vw_4$. The wheel speed indicative voltage signals $Vw_1$, $Vw_2$, $Vw_3$ and $Vw_4$ of the wheel speed derivation circuits 18FL, 18FR, 18RL and 18RR are fed to a microprocessor-based controller 22 via analog-to-digital (A/D converters 20A, 20B, 20C and 20D. At the same time, the wheel speed indicative voltage signals $Vw_1$, $Vw_2$, $Vw_3$ and $Vw_4$ are fed to secondary lag factor digital filter circuits 23FL, 23FR, 23RL and 23RR. Respective filter circuits 23FL, 23FR, 23RL and 23RR are provided with A/D converter at the input side and digital-to-analog (D/A) converter at the output side. The filter circuits 23FL, 23FR, 23RL and 23RR limit wheel deceleration gradient as decreasing of the wheel speed, at a predetermined wheel deceleration gradient limit $-k_1$ and wheel acceleration gradient as increasing wheel speed at a predetermined wheel acceleration gradient limit $k_2$. The filter circuits 23FL, 23FR, 23RL and 23RR outputs analog form limited wheel speed indicative signals $Vw_1'$, $Vw_2'$, $Vw_3'$ and $Vw_4'$ to a select-HIGH switch 24. The select-HIGH switch 24 selects the greatest one of the input signals $Vw_1'$, $Vw_2'$, Vw$_3'$ and Vw$_4'$ to output select-HIGH output Vw$_{max}$. The select-HIGH output Vw$_{max}$ is fed to the controller 22. Simultaneously, the select-HIGH output Vw$_{max}$ is fed to an integrator circuit 26 as an initial value for the integrated circuit 26. The integrator circuit 26 is connected to the longitudinal acceleration sensor 12 to receive therefrom the longitudinal acceleration indicative signal G$_x$. The integrator circuit 26 latches the select-HIGH output Vw$_{max}$ from the select-HIGH switch 24 in response to a reset signal RST output from the controller 22 and, at the same clears an integrated value of the longitudinal acceleration indicative signal and restart integration of the longitudinal acceleration indicative signal G$_x$. The integrator circuit 26 adds the integrated value to the latched initial value, i.e. the instantaneous select-HIGH output Vw$_{max}$ upon occurrence of the reset signal RST for outputting a signal having a sum value. The sum value indicative signal output from the integrator circuit 26 serves as a vehicle body speed representative signal V$_{ref}$. The vehicle body speed representative signal V$_{ref}$ is input to the controller 22 via an A/D converter 27. Furthermore, the longitudinal acceleration indicative signal Gx of the longitudinal acceleration sensor 12 is also input to the controller 22 via a low-pass filter 28 for removing high frequency noise component and an A/D converter 29.

The controller 22 comprises an input interface 37, an arithmetic circuit 38 which generally comprises CPU, a memory unit 39 which generally includes RAM and ROM, and an output interface 40. The output interface 40 of the controller 22 is connected to amplifiers 41A, 41B and 41C of respective channels, each of which is associated with one of the pressure control valve units 16FL, 16FR, 16RL and 16RR for controlling the valve positions. The amplifier 41A is adapted to amplify an inlet (EV) control signal for controlling introduction of the pressurized working fluid into the associated one of the wheel cylinders 10FL, 10FR, 10RL and 10RR, and thus will be hereafter referred to as "EV amplifier". The amplifier 41B adapted to amplify an outlet (Av) control signal for controlling draining of the pressurized fluid from the associated one of the wheel cylinders 10FL, 10FR, 10RL and 10RR, which amplifier will be hereafter referred to as "Av amplifier". Also, the amplifier 41C is designed to amplify a pump control signal MR for controlling operation of a fluid pump in the pressure control valve unit 16FL, 16FR, 16RL and 16RR, and will be hereafter referred to as "MR amplifier".

The output interface 40 of the controller 22 is also connected a driver circuit 58 which is, in turn, connected to a pressure supply unit 56 which is hydraulically associated with a hydraulically controlled clutch 55 in a transfer unit 54 which controls power distribution for front and rear differential gear units 60 and 62. The driver circuit 58 outputs a driver signal for controlling the pressure supply unit 56 for generating a hydraulic pressure proportional to a power train control signal Ic commanding one of the four-wheel drive mode and the two-wheel drive mode. In the shown embodiment, the power train control signal Ic varies between HIGH level for commanding four-wheel drive mode and LOW level for commanding two-wheel drive mode. Therefore, the hydraulic pressure to be supplied to the hydraulic clutch 55 from the pressure supply unit 56 varies between HIGH level and LOW level. When the HIGH level hydraulic pressure is supplied, the hydraulic clutch 55 is engaged to distribute the engine output torque to both of the front and rear differential gear units 60 and 62. On the other hand, when the LOW level hydraulic pressure is supplied, the hydraulic clutch 55 is disengaged to disconnect the front differential gear unit 60.

Figure 2:
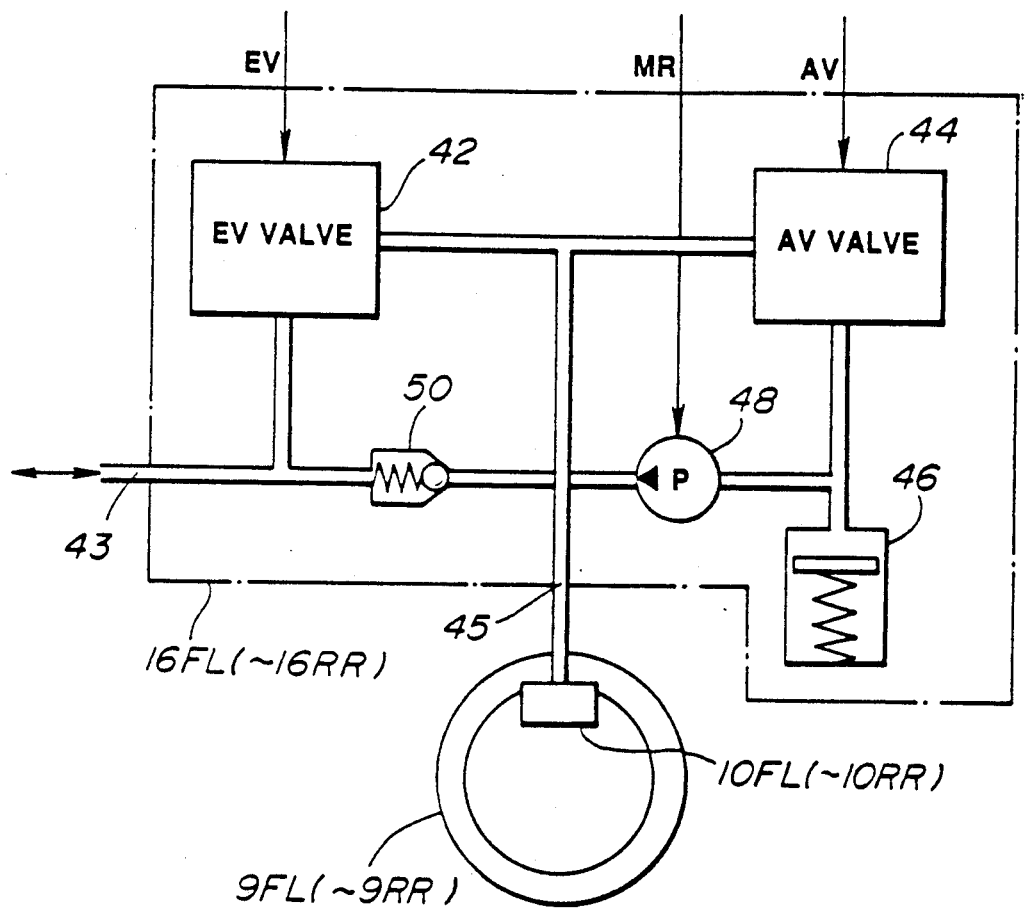
FIG. 2 is a block diagram showing detailed construction of a pressure control valve unit disposed in a vehicular brake circuit employed in the preferred embodiment of the anti-skid brake control system according to the invention.

As shown in FIG. 2, the pressure control valve unit 16 which reference numeral commonly represents the pressure control valve units 16FL, 16FR, 16RL and 16RR, comprises an induction control valve 42 which will be hereafter referred to as "EV valve", a drain control valve 44, which will be hereafter referred to as "AV signal" and a drain pump 48 and a pressure accumulator 46. The pressure control valve 16 has an inlet port 43 connected to the master cylinder 8 to receive the working fluid pressure built up in the latter and an outlet port 45 connected the wheel cylinder 10 which reference numeral generally represents the wheel cylinders 10FL, 10FR, 10RL and 10RR. The EV valve 42 is interposed between the inlet port 43 and the outlet port 45 for controlling introduction of the pressurized working fluid to the wheel cylinder 10. The AV valve 44 is connected to the outlet of the EV valve 42, the outlet port 45 at the inlet side and to the pressure accumulator 46 and the drain pump 48. The discharge outlet drain pump 48 is connected to the inlet port 43 via a one-way check valve 50 for returning part of working fluid in the pressure control valve unit 16 to the fluid reservoir (not shown) and designed for supplying pressurized working fluid.

With the construction set forth above, the pressure control valve unit 22 essentially operates in three mutually different operational modes. Name, the pressure control valve unit 22 operates in an APPLICATION mode for increasing braking pressure in the wheel cylinder 10, a RELEASE mode for decreasing braking pressure in the wheel cylinder, and a HOLD mode to maintain the braking pressure constant. In the APPLICATION mode position, the EV valve 42 is maintained in open position to establish fluid communication between the master cylinder 8 and the wheel cylinder 10 and the AV valve 44 is maintained in a closed position for blocking fluid communication between the wheel cylinder 10 and the pressure accumulator 46. At the same time, the drain pump 48 may be held inoperative state.

In the RELEASE mode position of the pressure control valve unit 16, the EV valve 42 is held closed to block fluid communication between the inlet port to the outlet port and whereby blocking pressure supply from the master cylinder 8 to the wheel cylinder 10. At the same time, the AV valve 44 is maintained at open position to establish fluid communication between the outlet port 45, and the pressure accumulator 46 and the drain pump 48 so that the pressurized fluid in the wheel cylinder 10 can be drained to the pressure accumulator 46 or to the fluid reservoir via the drain pump 48 and the one-way check valve 50. In order to drain part of the working fluid from the wheel cylinder to the fluid reservoir, the drain pump 48 is driven in this RELEASE mode. On the other hand, in the HOLD mode position, both of the EV valve 42 and the AV valve 44 are held closed for completely disconnecting the wheel cylinder 10 from the inlet port 43 and the pressure accumulator 46.

The EV valve 42 is held open position in response to LOW level EV signal and shifted to closed position in response to the HIGH level EV signal. On the other hand, the AV valve 44 is maintained at closed position as long as the AV signal is held LOW level and is opened by the HIGH level AV signal. The drain pump 48 is driven by the HIGH level MR signal.

The pressure control valve unit 16 is generated operated in the aforementioned three mode positions over skid control cycles. In general, skid control cycle is scheduled as follows:

1) the pressure control valve unit 16 is maintained at the APPLICATION mode position upon initiation of the braking operation which is triggered by depression of the brake pedal 6;

2) by application of the braking force to the brake pedal, working fluid pressure is built up in the master cylinder 8, since the pressure control valve unit 16 is held at the APPLICATION mode position, the braking pressure in the wheel cylinder 10 is increased linearly in proportion to increasing of the working fluid pressure to decelerate the wheel speed;

3) by increasing of the braking pressure, wheel deceleration $-\alpha$ (negative value of wheel acceleration) increases and becomes greater than a predetermined deceleration threshold $-\alpha_{ref}$, the control unit 22 is responsive to the wheel deceleration increased across the deceleration threshold to initiate skid control cycle, upon which the skid control cycle enters into HOLD mode cycle period to place the pressure control valve unit 16 at the HOLD mode position to maintain the increased level of braking pressure constant;

4) by holding the increase level of braking pressure in the HOLD mode position of the pressure control valve unit 16, wheel is decelerated to increase wheel slippage across a predetermined wheel slippage threshold, the control unit 22 is responsive to increasing of the wheel slippage increasing across the wheel slippage threshold to terminal the HOLD mode cycle period and trigger RELEASE mode cycle period, in which the pressure control valve unit 16 is placed in the RELEASE mode position to decrease braking pressure in the wheel cylinder 10;

5) by maintaining the pressure control valve unit 16 in the RELEASE mode position, braking pressure is reduced and thus wheel is accelerated to result in increasing of wheel acceleration $+\alpha$ across a predetermined wheel acceleration threshold $+\alpha_{ref}$, the control unit 22 is responsive to increasing of the wheel acceleration $+\alpha$ across the wheel acceleration threshold $+\alpha_{ref}$ to terminate the RELEASE mode cycle period and trigger a HOLD mode cycle period to switch the position of the pressure control valve unit 16 from the RELEASE mode position to the HOLD mode position in order to hold the braking pressure at the lowered level;

6) by maintaining the pressure control valve unit 16 at the HOLD mode, wheel speed is resumed and increased across the vehicle body speed and subsequently return to the speed corresponding to the vehicle body speed, the control unit 22 is responsive to the wheel speed once increased across the vehicle body speed and subsequently return to the vehicle body speed to terminate HOLD mode cycle period and trigger APPLICATION mode cycle period;

skid cycles 3) to 6) are repeated while anti-skid control is active.

The followings are discussion of the practical process of anti-skid brake control operation performed by the preferred embodiment of the anti-skid brake control system set forth above.

The shown embodiment of the anti-skid brake control system is triggered in response to turning ON of the ignition switch to initiate power supply. Then, wheel speed sensors 12FL, 12FR, 12RL, 12RR start monitoring of rotation speed of respectively corresponding wheels 9FL, 9FR, 9RL and 9RR. The wheel speed sensors 12FL, 12FR, 12RL and 12RR thus continuously produce the wheel speed indicative signals $v_1$, $v_2$, $v_3$ and $v_4$. The alternating current form wheel speed indicative signals $v_1$, $v_2$, $v_3$ and $v_4$ are cyclically or peridically converted into digital wheel speed indicative data $Vw_1$, $Vw_2$, $Vw_3$ and $Vw_4$ to be input to the microprocessor 22. Simultaneously, the wheel speed indicative voltage signals $Vw_1$, $Vw_2$, $Vw_3$ and $Vw_4$ are fed to the wheel speed filters 24FL, 24FR, 24RL and 24RR. The wheel speed filters 24FL, 24FR, 24RL and 24RR derive wheel speed variation data with a predetermined period, e.g 5 msec, to compare with acceleration limit value $k_2$, e.g. 0.8 km/h and deceleration limit value $-k_1$, e.g. $-1$ km/h. When the wheel speed variation data is smaller than the deceleration limit value $-k_1$ or greater than the acceleration limit $k_2$, the instantaneous wheel speed indicative voltage signal level is modified to maintain the variation within the given range defined by the acceleration limit value $k_2$ and the deceleration limit value $-k_1$. The wheel speed filters 24FL, 24FR, 24RL and 24RR thus produces the limited wheel speed indicative signals $Vw_1'$, $Vw_2'$, $Vw_3'$ and $Vw_4'$. On the other hand, when the difference is maintained with the given range, the wheel speed indicative voltage signals $Vw_1$, $Vw_2$, $Vw_3$ and $Vw_4$ are output as the limited wheel speed indicative signals $Vw_1'$, $Vw_2'$, $Vw_3'$ and $Vw_4'$. The select-HIGH switch 25 selects one of the greatest wheel speed indicative signal among the four limited wheel speed indicative signals $Vw_1'$, $Vw_2'$, and $Vw_3'$ and $Vw_4'$ as the maximum wheel speed indicative data $Vw_{max}$.

On the other hand, the longitudinal acceleration indicative signal Gx of the longitudinal acceleration sensor 13 is converted into an absolute value signal $|Gx|$ in the absolute value circuit 29 and summed with the offset value A of the offset value generator circuit 27 at the summing junction 28. The longitudinal acceleration indicative signal containing the offset value is thus input to the integrator circuit 26. The integrator circuit 26 is periodically or cyclically reset by the HIGH level reset signal. Therefore, as long as the reset signal RST is held HIGH level, the initial vehicle body speed representative value $V_{ref}$ is cyclically or periodically reset to update the stored initial value with the maximum wheel speed indicative value $Vw_{max}$.

The routines shown in FIGS. 3 to 7 are triggered every predetermined timing, e.g. every 20 msec while the vehicular braking state is maintained. It should be noted that the routines shown in FIGS. 3 to 7 are executed with respect to each wheel independently of each other. The routines for respective wheels may be executed every four cycles of execution cycles. In the alternative, respective execution cycles of the routines for respective wheels may be performed at different phases so as to enable independent brake control at equal interval, e.g. 20 msec.

Figure 3:
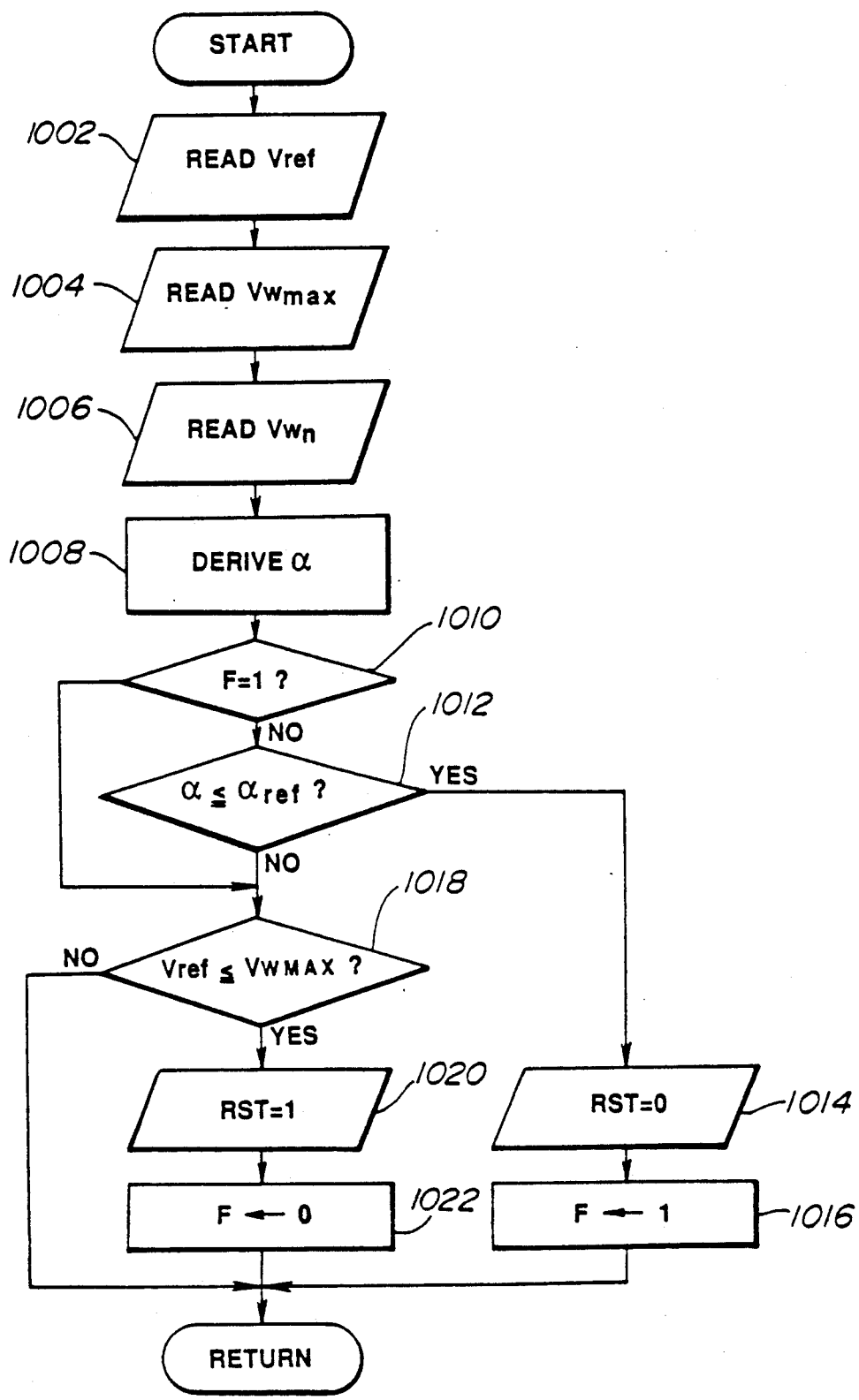
FIG. 3 is a flowchart showing an interrupt routine for setting and resetting a skid cycle indicative flag.

In the process illustrated in FIG. 3, at a step 1002 performed immediately after starting execution, the vehicle body speed representative data $V_{ref}$ is read out and temporarily stored in a temporary register in the memory unit 34. Then, the maximum wheel speed indicative data $Vw_{max}$ is read out at a step 1004 and temporarily stored in the temporary register. Similarly, at a step 1006, the wheel speed indicative data $Vw_n$ (n=1, 2, 3, 4). The wheel speed indicative data $Vw_n$ read out is stored in the temporary register.

At a step 1008, a wheel acceleration α is calculated on the basis of the instantaneous wheel speed indicative data with precedingly read wheel speed data. It is of course possible to derive the wheel acceleration on the basis of the wheel speed difference between the instantaneous wheel speed indicative data value and the wheel speed indicative data value read at immediately preceding execution cycle, and a known execution interval. However, it is also possible to derive the wheel acceleration more precise manner as disclosed in the foregoing U.S. Pat. Nos.

U.S. Pat. No. 4,392,202, issued on July 5, 1983
U.S. Pat. No. 4,384,330, issued on May 23, 1984

Furthermore, it is also possible to derive the wheel acceleration by differentiating the wheel speed indicative data as disclosed in the United States Patents listed herebelow.

U.S. Pat. No. 4,430,714, issued on Feb. 7, 1984

All of the above-identified United States Patents are owned by the common assignee to the present invention. The disclosure of these U.S. Patents are herein incorporated by reference for the sake of disclosure.

At a step 1010, a skid cycle indicative flag F1 is checked whether is set or not. The skid cycle indicative flag F1 indicates the state of derivation of a vehicle speed representative data $V_{ref}$. Namely, the skid cycle indicative flag F1 is set when the vehicle speed representative data $V_{ref}$ is derived utilizing the integrated value of the longitudinal acceleration indicative data $(|Gx|+A)$. When the skid cycle indicative flag F1 is not set as checked at the step 1010, the wheel acceleration α is compared with the deceleration threshold $-\alpha_{ref}$ at a step 1012. If the wheel acceleration is smaller than or equal to the deceleration threshold $-\alpha_{ref}$, in other words the wheel deceleration is greater than the deceleration threshold, as checked at the step 1012, then the HIGH level reset signal RST is output at a step 1014 to the integration circuit 26. By the leading edge of the HIGH level reset signal RST, the integration circuit 26 is enable to sum the latched maximum wheel speed indicative data $Vw_{max}$ with the integrated value of the longitudinal acceleration indicative data $(|Gx|+A)$. Thereafter, the skid cycle indicative flag F1 is set at a step 1016.

On the other hand, when the wheel acceleration α is greater than the deceleration threshold $-\alpha_{ref}$ as checked at the step 1012, the vehicle body speed indicative data $V_{ref}$ is compared with the maximum wheel speed indicative data $Vw_{max}$ at a step 1018. If the vehicle body speed representative data $V_{ref}$ is smaller than or equal to the maximum wheel speed indicative data $Vw_{ref}$ as checked at the step 1018, then the LOW level reset signal RST is output at the step 1020 for resetting the stored value in the integration circuit 26 and for latching the instantaneous maximum wheel speed indicative data $Vw_{max}$. Thereafter, the skid cycle indicative flag F1 is reset at a step 1022.

On the other hand, when the skid cycle indicative flag F1 is set as checked at the step 1010, then process jumps the step 1012 and directly goes to the step 1018. Also, when the vehicle body speed representative data $V_{ref}$ is greater than the maximum wheel speed indicative data $Vw_{max}$ as checked at the step 1018, then process directly goes END.

Figure 4:
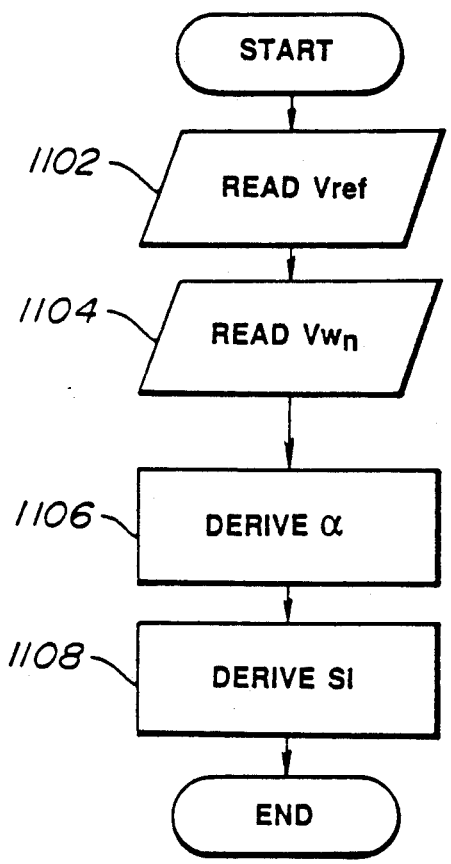
FIG. 4 is a flowchart showing an interrupt routine for deriving wheel acceleration and a wheel slippage.

FIG. 4 illustrates another routine for deriving the wheel acceleration α and the wheel slippage Si. The shown routine is also executed at a given interval, e.g. 20 msec. In the shown routine, the vehicle body speed representative data $V_{ref}$ is read out at a step 1102. At a step 1104, the instantaneous wheel speed indicative data $Vw_n$ is read out. The read vehicle body representative data $V_{ref}$ and the instantaneous wheel speed indicative data $Vw_n$ are temporarily stored in the temporary register.

At a step 1106, the wheel acceleration α is derived on the basis of the wheel speed indicative data $Vw_n$. Then, wheel slippage Si is calculated by the following equation:

$$Si = \{(V_{ref} - Vw_n)/V_{ref}\} \times 100 \ (\%)$$

at a step 1108. After deriving the wheel slippage Si, the process returns to the background job.

Figure 5:
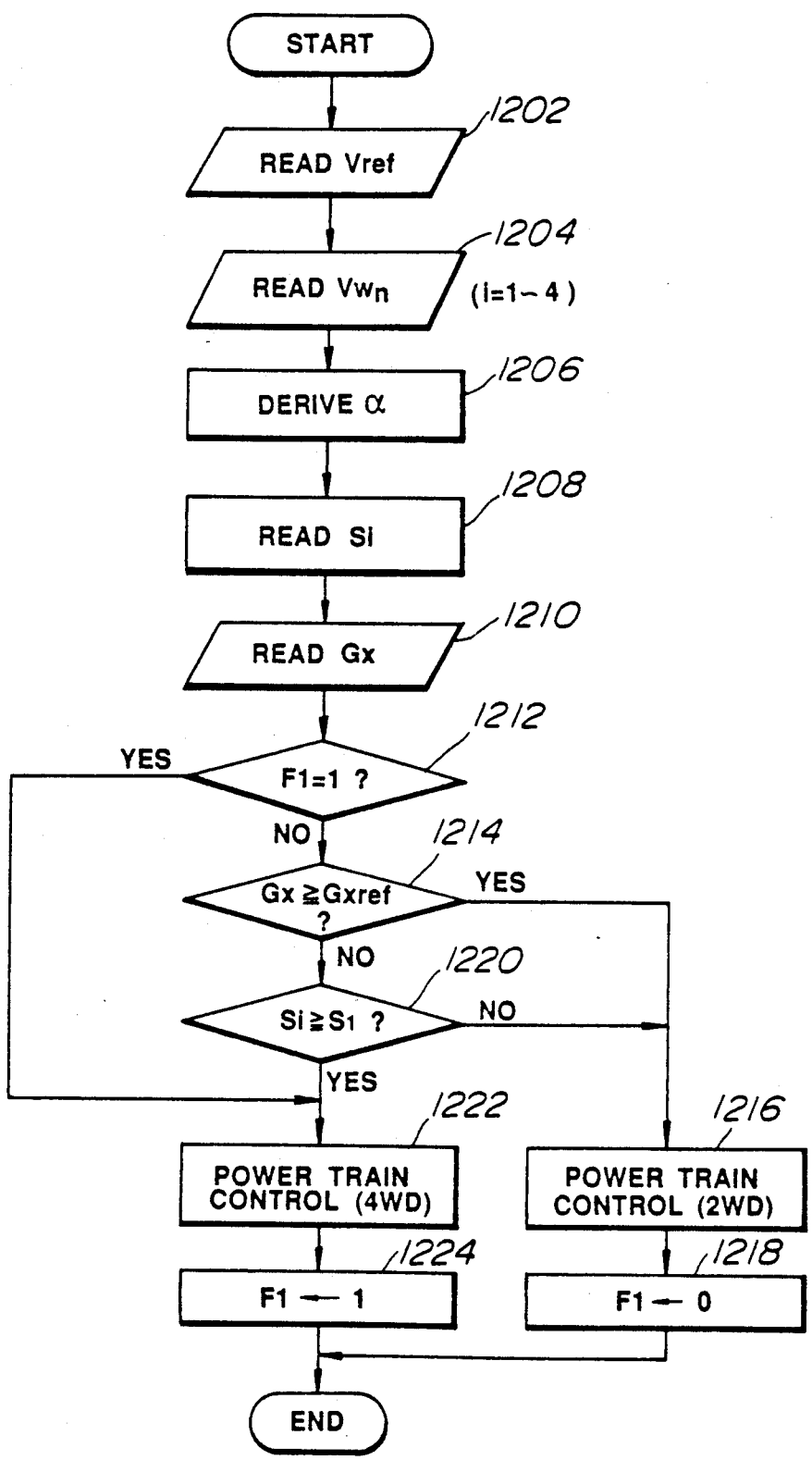
FIG. 5 is a flowchart showing an interrupt routine for controlling a power train operation mode.

In the process illustrated in FIG. 5, at a step 1202 performed immediately after starting execution, the vehicle body speed representative data $V_{ref}$ is read out and temporarily stored in a temporary register in the memory unit 34. Then, the wheel speed indicative data $Vw_n$ is read out at a step 1204 and temporarily stored in the temporary register. Similarly, at a step 1206, the wheel acceleration α is derived on the basis of the wheel speed indicative data $Vw_n$. At a step 1208, the wheel slippage Si is derived and at a step 1210, the longitudinal acceleration indicative signal Gx is read out.

Thereafter, the skid cycle indicative flag F1 is checked at a step 1212. If the skid cycle indicative flag F1 is set as checked at the step 1212 and whereby active state of the anti-skid control system is detected, the longitudinal acceleration indicative data Gx is compared with a longitudinal acceleration threshold $Gx_{ref}$ at a step 1214. When the longitudinal acceleration indicative data Gx is greater than or equal to the longitudinal acceleration threshold $Gx_{ref}$ as checked at the step 1214, then the LOW level power train control signal Ic commanding the two-wheel drive mode is output at a step 1216. Thereafter, at a step 1218, the skid cycle indicative flag F1 is reset.

On the other hand, when the longitudinal acceleration indicative data Gx is smaller than the longitudinal acceleration threshold $Gx_{ref}$ as checked at the step 1214, then, the wheel slippage Si is compared with a predetermined a predetermined wheel slippage criterion $S_1$ at a step 1220. The wheel slippage criterion $S_1$ is set for discriminating the vehicular decelerating condition between that requiring four-wheel drive mode of the power train and that requiring two-wheel drive mode of the power train. In the shown embodiment, the wheel slippage criterion is set at 40% which is much greater than a wheel slippage threshold $S_0$ for discriminating the vehicular braking state requiring HOLD mode and RELEASE mode. When the wheel slippage Si as checked at the step 1220 is greater than or equal to the wheel slippage criterion $S_1$, then process goes to the step 1214 for outputting the LOW level power train control signal Ic. On the other hand, if the wheel slippage Si is smaller than the wheel slippage criterion $S_1$, then, the HIGH level power train control signal Ic commanding the four-wheel drive mode is output at a step 1222. Thereafter, the skid cycle indicative flag F1 is set at a step 1224.

On the other hand, when the skid cycle indicative flag F1 is set as checked at a step 1214, process jumps the steps 1214 and 1220 and thus directly goes to a step 1222.

After one of the step 1216 and 1224, process goes END and return to the main routine.

Figure 6:
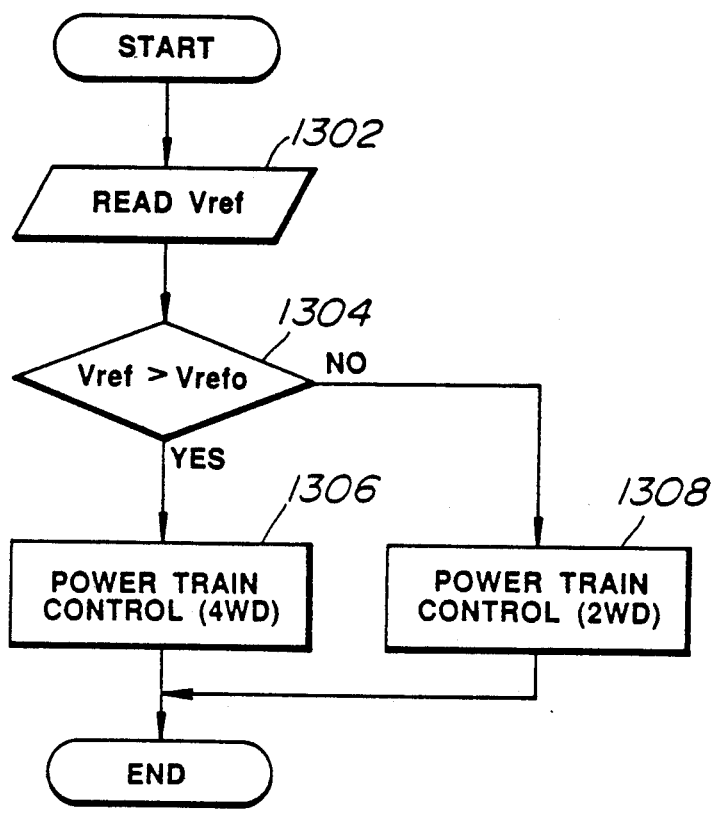
FIG. 6 is a flowchart showing an interrupt routine for selecting operation mode of the pressure control valve unit of FIG. 2.

FIG. 6 is another routine for selecting the operation mode of the power train. In execution of the routine of FIG. 6, the vehicle body speed representative data $V_{ref}$ is read at a step 1302. The read vehicle body speed representative data $V_{ref}$ is compared with a vehicle body speed criterion $V_{ref0}$ at a step 1304. If the vehicle body speed representative data $V_{ref}$ as checked at the step 1302 is greater than the vehicle speed criterion $V_{ref0}$, then, HIGH level power train control signal Ic is output at a step 1306 for operating the power train into the four-wheel drive mode. On the other hand, when the vehicle body speed representative data $V_{ref}$ is smaller than or equal to the vehicle body speed criterion $V_{ref0}$ as checked at the step 1304, then, LOW level power train control signal Ic is output to operate the power train into the two-wheel drive mode at a step 1308.

Figure 7:
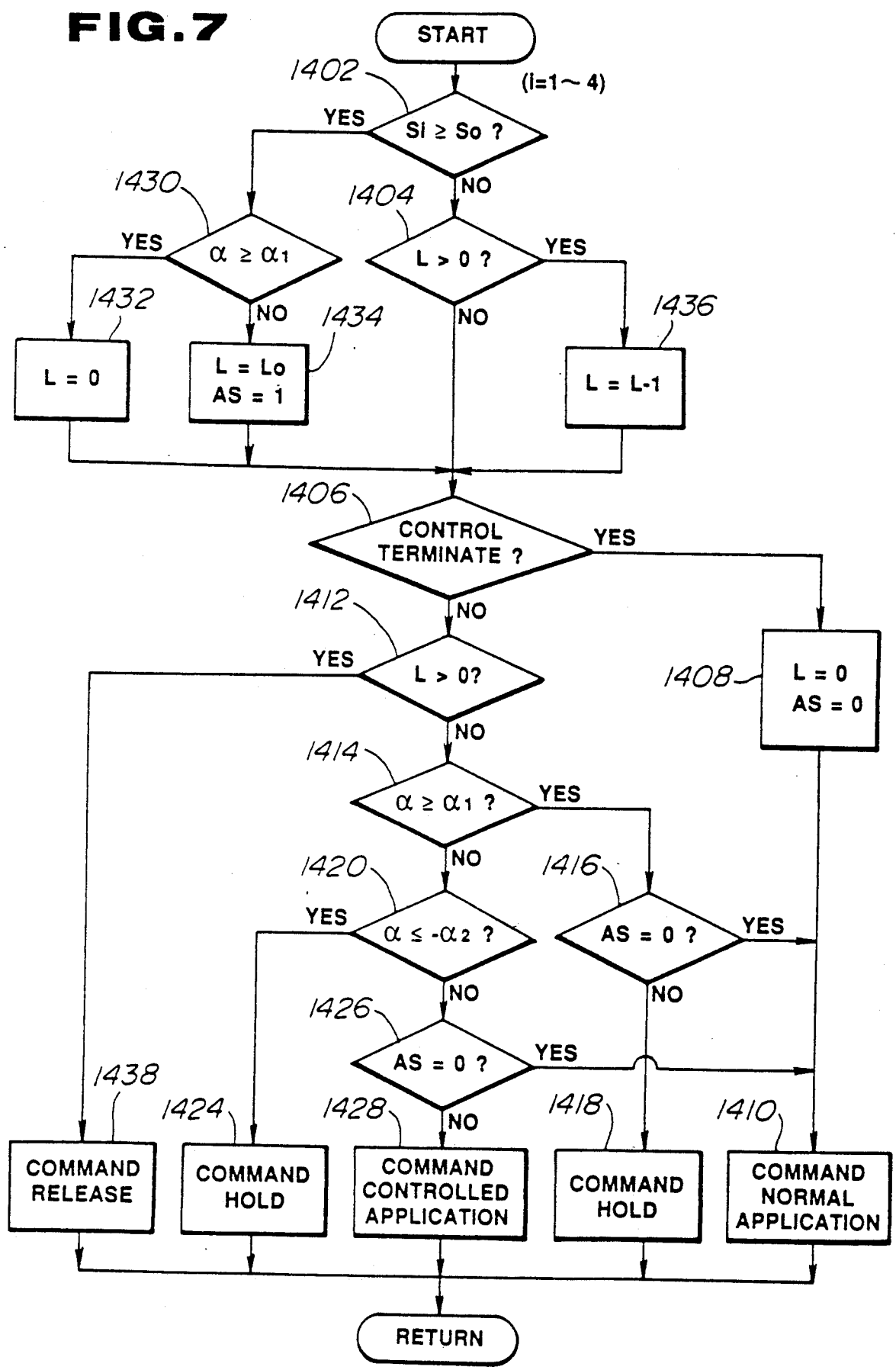
FIG. 7 is a flowchart showing an interrupt routine for selecting operation mode of the power train depending upon a projected vehicle body speed.

FIG. 7 shows a skid cycle control routine for controlling the skid control cycle generally according to the schedule set forth in the general discussion of the process of anti-skid brake control. The skid cycle control routine of FIG. 7 with the discussed herebelow with additionally reference to FIGS. 8 and 9. It should be noted in the timing chart of FIG. 8, the lines showing the wheel speed $Vw_n$, the maximum wheel speed $Vw_{max}$, the vehicle body speed $V_{ref}$ are illustrated in a phase shifted manner so as to show respective speed variation clearly.

Figure 9:
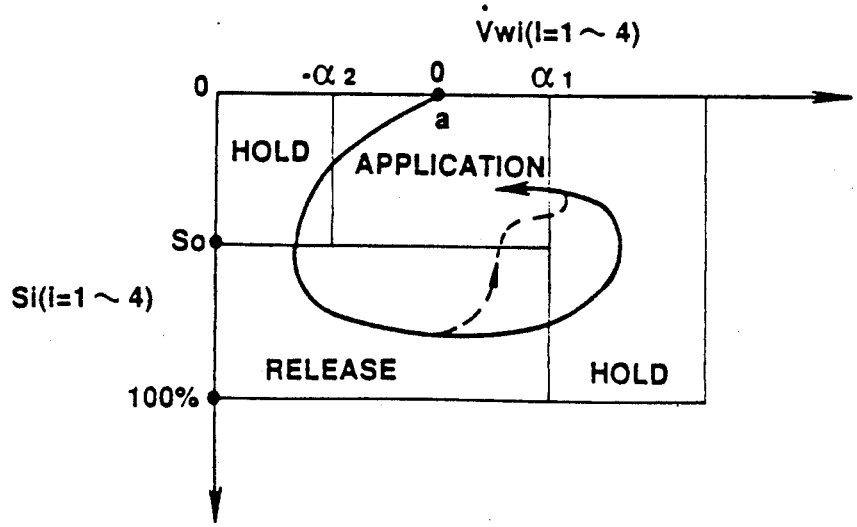
FIG. 9 is an illustration showing schedule of skid control cycle in an anti-skid brake control.

It is assumed that the vehicle is traveling steadily before braking operation and anti-skid control being not active. Unless brake is applied, wheel slippage Si is generally maintained zero. Therefore, in the skid cycle control schedule as shown in FIG. 9, the entering point to enter the vehicle braking state is a. At this condition, the routine of FIG. 7 is triggered to be periodically executed in response to depression of the brake pedal.

Immediately after starting execution, the wheel slippage Si is compared with a predetermined wheel slippage threshold $S_0$ at a step 1402. The wheel slippage threshold $S_0$ may be set at about the optimum wheel slippage range where an optimum vehicle braking efficiency can be obtained. In the shown embodiment, the wheel slippage threshold $S_0$ is set at 15%.

At the initial stage of the braking operation, wheel slippage Si is held smaller than that wheel slippage threshold $S_0$. Therefore, the answer at the step 1402 at the initial braking state becomes negative. Then, at a step 1404, check is performed whether a RELEASE mode timer value L of a RELEASE mode timer (not shown but facilitated in the arithmetic circuit 34 of the microprocessor 22) is greater than zero or not. At this time, the RELEASE mode timer value L is maintained at zero, the answer at the step 1404 also becomes negative. Then, at a step 1406, judgment is made that the condition satisfies a predetermined skid control terminating condition.

In the practical embodiment, the skid control terminating conditions are set as follows:

when the vehicle body speed indicative data $V_{ref}$ is smaller than or equal to a vehicle body stopping state indicative reference value $V_{ref0}$;

when number of occurrence of switching of the pressure control valve mode position in the CONTROLLED APPLICATION mode becomes greater than or equal to a predetermined value $N_0$; and when the brake switch is turned OFF.

When the skid control terminating condition is satisfied as checked at the step 1406, the RELEASE mode timer value L is cleared and a skid control state indicative period flag AS is reset at a step 1408. At a step 1410, Thereafter, process goes END.

If the skid control terminating condition as checked at the step 1406 is not satisfied, the RELEASE mode timer value L is again checked at a step 1412. When the RELEASE mode timer value L is smaller than or equal to zero as checked at the step 1412, the wheel acceleration α is compared with a predetermined acceleration threshold $+\alpha_1$ at a step 1414. If the acceleration as checked at the step 1414 is greater than or equal to the wheel acceleration threshold $+\alpha_1$, it means that the wheel is not yet decelerated after initiation of increasing of the braking pressure or wheel is acceleration during RELEASE mode cycle period. Therefore, in order to discriminate the instantaneous status of the braking condition, check is performed whether the skid control state indicative flag AS is set at a step 1416. When the skid control state indicative flag AS is not set as checked at a step 1416, then process goes to the process through the step 1410 for setting the operation mode to the NORMAL APPLICATION mode.

On the other hand, when the skid control state indicative flag AS is set as checked at the step 1416, then judgment is made that it is the timing to switch the skid control cycle from the RELEASE mode cycle period to the HOLD mode cycle period because the wheel acceleration α is held greater than the wheel acceleration threshold $+\alpha_1$ and the operational mode is held in the RELEASE mode. Then, HOLD mode cycle period is commanded at a step 1418. After commanding the HOLD mode cycle period, the process goes END.

On the other hand, when the wheel acceleration α as compared with the wheel acceleration threshold $+\alpha_1$ at the step 1414, is smaller than the acceleration threshold $+\alpha_1$, then the wheel acceleration α is checked with a predetermined wheel deceleration threshold $-\alpha_2$ at a step 1420. When the wheel acceleration α as checked at the step 1420 is smaller than the wheel deceleration threshold $-\alpha_2$, it means that the braking condition requires anti-skid control. Then, at a step 1422, the HOLD mode cycle period is commanded for placing the pressure control valve 16 at the HOLD mode position, at a step 1424.

If the wheel acceleration α as compared with the wheel deceleration threshold $-\alpha_2$ at the step 1420 is greater than the wheel deceleration threshold, the skid control state indicative flag AS is checked at a step 1426. If the skid control mode indicative flag AS is not set as checked at the step 1426, process goes to the step 1408. On the other hand, when the skid control state indicative flag AS is not set as checked at the step 1426, the CONTROLLED APPLICATION node cycle period is commanded at a step 1426.

On the other hand, when wheel slippage Si as checked at the step 1402 is greater than or equal to the wheel slippage threshold $S_0$, then the wheel acceleration α is compared with the wheel acceleration threshold $+\alpha_1$ at a step 1430. When the wheel acceleration α as checked at the step 1430 is greater than or equal to the wheel acceleration threshold $+\alpha_1$, judgment can be made that the condition does not satisfy to perform the RELEASE mode skid control cycle period operation.

Therefore, the RELEASE mode timer value L is cleared at a step 1432. On the other hand, when the wheel acceleration α as checked at the step 1430 is smaller than the wheel acceleration threshold $+α_1$, judgment can be made that a condition for performing the RELEASE mode skid control mode cycle period is satisfied. Therefore, at a step 1434, the RELEASE mode timer value L is set at a predetermined initial timer value $L_0$ which represents a period to maintain RELEASE mode skid control cycle period after the wheel slippage Si is decreased across the wheel slippage threshold $S_0$. At the same time, the skid control state indicative flag AS.

When the RELEASE mode timer value L as checked at the step 1404 is greater than zero (0), then, the RELEASE mode timer value L is decremented by one (1) at a step 1436 and thereafter process moves to the step 1406. When the RELEASE mode timer value L as decremented at the step 1436 is still held greater than zero (0), the answer at the step 1412 becomes positive since the RELEASE mode timer value is greater than zero. Then, process goes to a step 1438.

Figure 8:
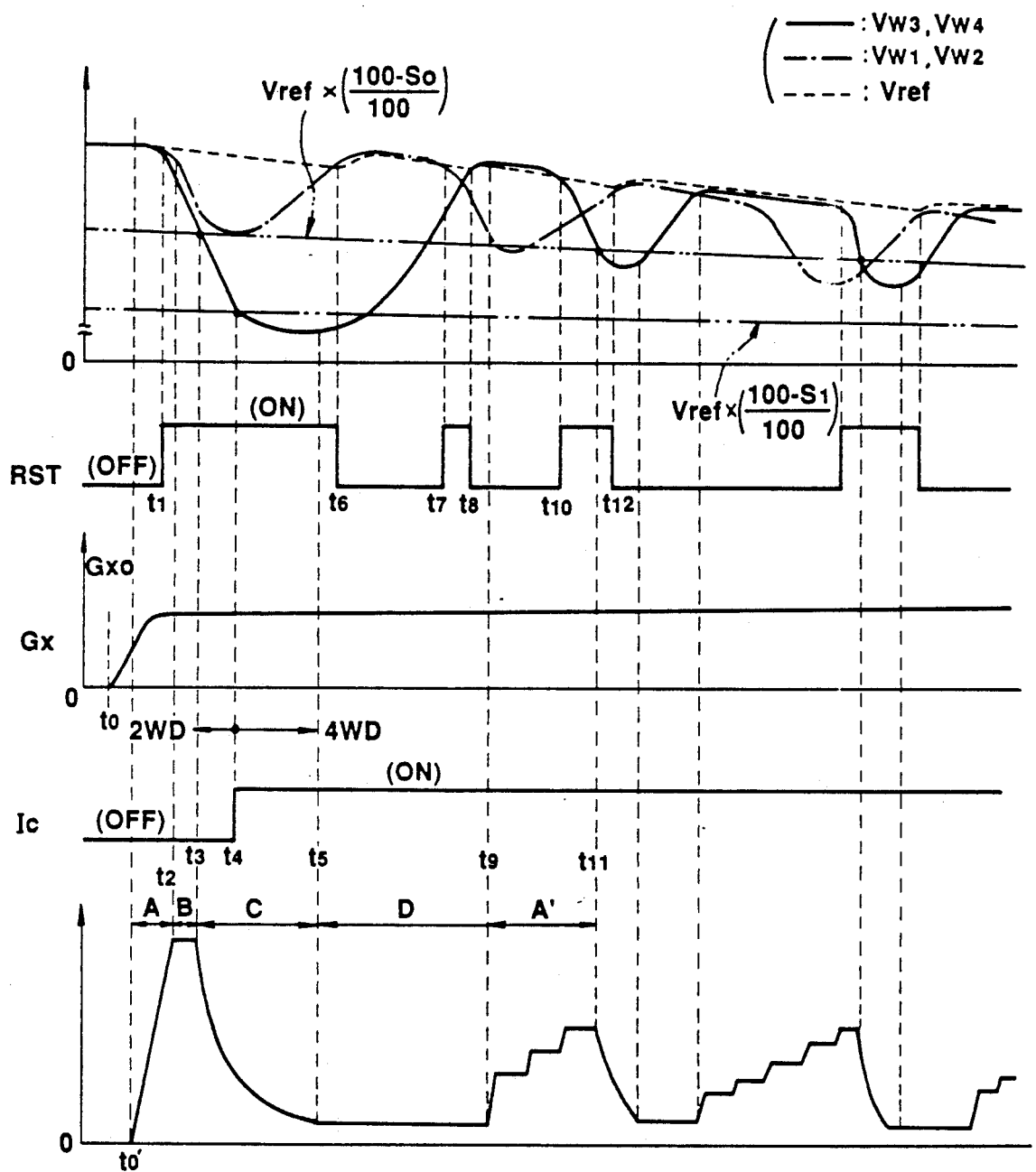
FIG. 8 is a timing chart showing operation of the preferred embodiment of the anti-skid brake control system according to the invention.

The example of practical operation of anti-skid control performed through the routine of FIG. 7 will be discussed herebelow with reference to FIGS. 8 and 9. It should be noted that, in FIG. 8, the solid line shows variation of wheel speed $Vw_3$ and $Vw_4$ of the rear wheels; one-dot line shows variation of wheel speed $Vw_1$ and $Vw_2$ of the front wheels; and the broken line shows variation of the vehicle body speed representative data $V_{ref}$.

At the initial stage of braking operation starting at the time $t_0$, the wheel acceleration u is decreased across the wheel deceleration threshold $α_{ref}$ to switch the reset signal level from HIGH level to LOW level. This results in introduction of the longitudinal acceleration data $|Gx+A|$ for deriving the vehicle body speed representative data $V_{ref}$ by $$V_{ref} = Vw_{max} + \int(|Gx|+A)\,dt$$

through the steps 1012 to 1016. The wheel slippage Si is held smaller than the wheel slippage threshold $S_0$. Therefore, the answer in the step 1402 is held negative. At this time, since the anti-skid control is not yet initiated, the RELEASE mode timer value L is maintained zero (0). Therefore, the answer at the step 1404 also becomes negative. Since the brake is applied, the answer in the step 1406 is negative to indicate that the condition for satisfying termination of the anti-skid control is not established.

Example of the practical anti-skid brake control will be discussed herebelow with reference to FIG. 8. In order to simplify the discussion given herebelow, assumption is given that the wheel speed $Vw_1$ and $Vw_2$ of the front wheels are same to each other and the wheel speed $Vw_3$ and $Vw_4$ of the rear wheels are also same to each other. Furthermore, in the curves representative of respective speeds are shown in slightly offset form so as to avoid overlapping which makes it difficult to visually appreciate the variations. It is further assumed that the vehicle is driven in the operation mode of the power train selected into the two-wheel drive mode. The vehicle is assumed to travel on a slippy, low friction road, such as icy road or snow road. At a time $t_0$, an operational force to an accelerator pedal is released. Then, the vehicle driving mode moves into engine braking mode for decelerating by negative driving torque of the engine. Since the negative driving torque is applied only to the rear wheels which are connected to the engine via the power train, therefore, the rear wheel subject decelerating force for deceleration. On the other hand, since the front wheels are free from the negative driving torque, they decelerate according to deceleration of the vehicle body. At a time $t_0'$, the brake pedal 6 is depressed for braking operation. At the time $t_0'$, the wheel slippage Si is maintained smaller than the wheel slippage threshold $S_0$ and the wheel deceleration (negative value of wheel acceleration) is maintained smaller than the wheel deceleration threshold $-α_2$, the NORMAL APPLICATION mode is commanded at the step 1410 of the routine of FIG. 7. Accordingly, the braking pressure in respective wheel cylinders 10FL, 10FR, 10RL and 10RR increases according to building up of hydraulic pressure in the master cylinder 8. At the same time, since the longitudinal acceleration indicative data (positive value representing vehicular deceleration) Gx is maintained smaller than the longitudinal acceleration criterion $Gx_{ref}$ and the wheel slippage Si is naturally held smaller than the wheel slippage criterion $S_1$, therefore, operation mode of the power train is maintained at the two-wheel drive mode.

Until the wheel acceleration α decreased to be smaller than the deceleration threshold $-α_2$ is detected at the step 1410, the NORMAL APPLICATION mode is repeatedly commanded at the step 1410 for increasing the braking pressure in linear fashion as illustrated in the period $t_0'$ to $t_2$. The wheel speed data $Vw_n$ thus starts to decrease with a certain lag time. During the period, in which NORMAL APPLICATION mode is maintained, deceleration rate at the rear wheels become greater than that of the front wheels because of negative driving torque active on the rear wheels. Therefore, at the initial stage of braking operation, the NORMAL APPLICATION mode skid cycle is performed for a period a as indicated in FIG. 8. At a time $t_1$, the wheel acceleration decreases across the deceleration threshold $-α_{ref}$, this causes the answer at the step 1012 of the routine of FIG. 3 positive. Therefore, HIGH level reset signal RST is output at the step 1014 for enabling the integration circuit 26. Then, the integration circuit 26 starts to integrate the longitudinal acceleration indicative data Gx to output the vehicle speed representative data $V_{ref}$. At a time $t_2$, the wheel acceleration $-α$ is further decreased across the wheel deceleration threshold $-α_2$ due to increased braking pressure in the wheel cylinders 10FL, 10FR,, 10RL and 10RR.

Therefore, the answer in the step 1420 turns into positive. As a result, the HOLD mode skid control cycle period is commanded at the step 1424. Therefore, the anti-skid control system becomes active for performing anti-skid brake control operation. The HOLD mode skid control cycle period is maintained for period until the wheel slippage Si is increased across the wheel slippage threshold $S_0$.

When the wheel slippage Si becomes greater than or equal to the wheel slippage threshold $S_0$ at a time $t_3$, the answer in the step 1402 becomes positive. At the initial stage of the RELEASE mode skid control cycle period, the wheel acceleration α is maintained smaller than the wheel acceleration threshold $+α_2$. Therefore, the answer in the step 1430 becomes negative. This causes setting of the RELEASE mode timer value L to the initial value $L_0$ and setting of the skid control state indicative flag AS, at the step 1434. By setting the RELEASE mode timer value L to $L_0$, the answer in the step 1412 becomes positive to command RELEASE mode skid control cycle period at the step 1438.

By decreasing the braking pressure in the RELEASE mode skid control cycle period, the wheel speed is resumed to decrease wheel slippage Si across the wheel slippage threshold $S_0$. This results in negative answer in the step 1402. As long as the RELEASE mode timer value L is held greater than zero (0), the answer in the step 1404 is held positive and is decreased by one (1) every occurrence of execution of the routine of FIG. 7. As long as the RELEASE mode timer value L is maintained greater than zero (0), the RELEASE mode skid control cycle period is repeatedly commanded for maintaining the pressure control valve 16 at the RELEASE mode position, as illustrated in FIG. 8.

During the RELEASE mode operation, because of negative driving torque or engine braking force exerted on the rear wheels $Vw_3$ and $Vw_4$, the rear wheels are still held in deceleration mode for further decreasing the wheel speed. As a result, wheel slippage Si is increased to reach the wheel slippage criterion $S_1$ at a time $t_4$. In response to this, the power train control signal Ic is switched from HIGH level at the step 1222 for switching operation mode of the power train from the two-wheel drive mode to the four-wheel drive mode.

When the RELEASE mode timer value L is decreased to zero at the step 1436 or, in the alternative, when the wheel acceleration $\alpha$ becomes greater than or equal to the wheel acceleration threshold $+\alpha_1$ to turn the answer in the step 1430 into positive to cause clearing the RELEASE mode timer value L to zero at the step 1432, the answer in the step 1412 becomes negative. At this time, since the wheel acceleration $\alpha$ is greater than or equal to the wheel acceleration threshold $+\alpha_1$ and the skid control state indicative flag AS is set, the HOLD mode skid control cycle period is commanded at the step 1418 at a time $t_5$.

During the HOLD mode skid control cycle period, wheel speed $Vw_n$ is continued to increase to result that the maximum wheel speed indicative data $Vw_{max}$ becomes greater than or equal to the vehicle body speed representative data $V_{ref}$ at a time $t_6$. This causes the positive answer at the step 1018. Therefore, the reset signal RST is turned into HIGH level at the step 1020, and the skid cycle indicative flag F1 is reset at the step 1022 of the routine of FIG. 3. Since the reset signal RST is maintained at LOW level and the skid cycle indicative flag F1 is held reset state until the wheel acceleration $\alpha$ is again decreased to the wheel deceleration threshold $\alpha_{ref}$ at a time $t_7$, the vehicle body speed representative data $V_{ref}$ is derived at a corresponding value to the maximum wheel speed indicative data $Vw_{max}$. The period in which the vehicle body speed representative data $V_{ref}$ is derived to the value corresponding to the maximum wheel speed indicative data $Vw_{max}$ is illustrated as a period a' in the timing chart of FIG. 8.

By maintaining the skid control cycle at the HOLD mode skid control cycle period as set forth, the wheel acceleration $\alpha$ is decreased across the wheel acceleration threshold $+\alpha_1$. Then, the CONTROLLED APPLICATION mode skid control cycle period is commanded at the step 1428 since the skid control state indicative flag AS is held in set position.

Through the process as set forth above, precise brake control becomes possible. Furthermore, according to the present invention, since the longitudinal acceleration indicative data is provided the predetermined offset value for increasing the deceleration at given level, avoidance of no braking state can be assured.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the specific technologies have been disclosed hereinbefore in terms of the preferred embodiment of the present invention, the technologies disclosed in the following U.S. Patents, all owned by the common assignee to the present invention.

U.S. Pat. No. 4,408,290, issued on Oct. 4, 1983
U.S. Pat. No. 4,674,049, issued on June 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,780,818, issued on Oct. 25, 1988
U.S. Pat. No. 4,674,050, issued on June 16, 1987
U.S. Pat. No. 4,680,714, issued on July 14, 1987
U.S. Pat. No. 4,682,295, issued on July 21, 1987
U.S. Pat. No. 4,680,713, issued on July 14, 1987
U.S. Pat. No. 4,669,046, issued on May 26, 1987
U.S. Pat. No. 4,669,045, issued on May 26, 1987
U.S. Pat. No. 4,679,146, issued on July 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986
U.S. Pat. No. 4,662,686, issued on May 5, 1987
U.S. Pat. No. 4,667,176, issued on May 19, 1987
U.S. Pat. No. 4,597,052, issued on June 24, 1986
U.S. Pat. No. 4,637,663, issued on Jan. 20, 1987
U.S. Pat. No. 4,683,537, issued on July 28, 1987
U.S. Pat. No. 4,809,182, issued on Feb. 28, 1989
U.S. Pat. No. 4,805,103, issued on Feb. 14, 1989 will be applicable for implementing the present invention. Furthermore, the technology for cooperating with the power train control for switching operation of power train between four-wheel drive mode and two wheel drive modes may be applicable not only for anti-skid brake control system but also for traction control technologies utilizing technologies close to the anti-skid brake control. For example, the traction control technologies have been disclosed in the following U.S. Patents which are also owned by the common owner of the present invention:

U.S. Pat. No. 4,763,912, issued on Aug. 16, 1988
U.S. Pat. No. 4,771,850, issued on Sept. 20, 1988

The disclosure of the above-identified U.S. Patents will be herein incorporated by reference for the sake of disclosure.

What is claimed is:

1. A combination comprising:
a power train control system associated with an automotive internal combustion engine for distributing driving torque generated by said engine to primary driving wheels which are permanently coupled with said engine and auxiliary driving wheels which are disconnectably coupled with said engine, said power train control system being operative between a two-wheel drive mode for distributing driving torque only to said primary wheels and a four-wheel drive mode for distributing driving torque to all of said primary and auxiliary wheels;

an anti-skid brake control system for controlling braking pressure for maintaining wheel slippage in the vicinity of a predetermined optimum level, said anti-skid control system comprising:

a plurality of wheel cylinders;

a braking circuit connecting a pressurized fluid source to a respective wheel cylinder of said plurality of wheel cylinders for each of said primary and auxiliary wheels for building up braking pressure in the latter;

a plurality of pressure control valve means, each disposed in said braking circuit, for controlling braking pressure in an associated one of said wheel cylinders, each of said pressure control valve means being operable for increasing braking pressure in said associated one of said wheel cylinders in a first mode and for decreasing braking pressure in said associated one of said wheel cylinders in a second mode;

a plurality of first sensors, each monitoring rotation speed of an associated one of said primary and auxiliary wheels for producing a wheel speed indicative signal;

second means for deriving wheel slippage on the basis of said wheel speed indicative signal and producing wheel slippage data with respect to each of said wheels;

third means for producing a first control signal for controlling an operation mode of each of said pressure control valve means independently of other ones of said valve means for switching said operation mode between said first and second mode in order to maintain wheel slippage at each wheel in the vicinity of said predetermined optimum value, on the basis of said wheel slippage data; and fourth means, active while said third means is active, for detecting wheel slippage at said primary wheels which is greater than a predetermined wheel slippage criterion for producing a second control signal for controlling said power train control system to set said operation mode at said four-wheel drive mode.

2. A combination as set forth in claim 1, wherein said power train control system includes means for selectively connecting and disconnecting said auxiliary wheels from said engine, said connecting and disconnecting means disconnecting said engine from said auxiliary wheels in said two-wheel drive mode and connecting said engine to said auxiliary wheels in said four-wheel drive mode.

3. A combination as set forth in claim 2, wherein said connecting and disconnecting means comprises clutch means which is operable in response to a control fluid pressure variable according to a signal level of said second control signal.

4. A combination as set forth in claim 1, which further comprises second sensor means for monitoring longitudinal acceleration exerted on a vehicle body and producing a longitudinal acceleration indicative signal, and said fourth means is responsive to said longitudinal acceleration indicative signal representative of said longitudinal acceleration being greater than a predetermined longitudinal acceleration criterion for producing said second control signal for ordering said four-wheel drive mode of said power train control system.

5. A combination as set forth in claim 1, wherein said fourth means derives a wheel acceleration signal and is responsive to said wheel acceleration signal decreasing across a predetermined wheel deceleration threshold for initiating a skid cycle for controlling said operation mode of each of said pressure control valve means according to a predetermined schedule, and said fourth means operates in a normal arithmetic mode for deriving vehicle body speed representative data from a value corresponding to said wheel speed indicative signal value and a skid control state arithmetic mode for deriving said vehicle body speed on the basis of an initial value and an offset longitudinal acceleration indicative value in said skid cycle.

6. A combination as set forth in claim 5, wherein said fourth means compares said wheel acceleration signal with a predetermined threshold value so as to select said normal arithmetic mode when said wheel acceleration signal is maintained greater than or equal to said threshold value and to select said skid control state arithmetic mode otherwise.

7. In a combination of an anti-skid brake control system for controlling braking pressure for maintaining wheel slippage in the vicinity of a predetermined optimum level and a power train control system for controlling power distribution for primary driving wheels which are permanently coupled with an engine and auxiliary driving wheels which are disconnectably coupled with said engine and operable in a two-wheel drive mode for distributing engine driving torque only to said primary wheels and in a four-wheel drive mode for distributing driving torque to both said primary and auxiliary wheels, said anti-skid control system comprising:

a plurality of wheel cylinders;

a braking circuit connecting a pressurized fluid source to a respective wheel cylinder of said plurality of wheel cylinders for each of said primary and auxiliary wheels for building up braking pressure in the latter;

a plurality of pressure control valve means, each disposed in said braking circuit, for controlling braking pressure in an associated one of said wheel cylinders, each of said pressure control valve means being operable for increasing braking pressure in said associated one of said wheel cylinders in a first mode and for decreasing braking pressure in said associated one of said wheel cylinders in a second mode;

a plurality of first sensors, each monitoring rotation speed of an associated one of said primary and auxiliary wheels for producing a wheel speed indicative signal;

second means for deriving wheel slippage on the basis of said wheel speed indicative signal and producing wheel slippage data with respect to each of said wheels;

third means for producing a first control signal for controlling an operation mode of each of said pressure control valve means independently of other ones of said valve means for switching said operation mode between said first and second mode in order to maintain wheel slippage at each wheel in the vicinity of said predetermined optimum value, on the basis of said wheel slippage data; and fourth means, active while said third means is active, for detecting wheel slippage at said primary wheels which is greater than a predetermined wheel slippage criterion for producing a second control signal for controlling said power train control system to set said operation mode at said four-wheel drive mode.

8. An anti-skid brake control system as set forth in claim 7, which further comprises second sensor means for monitoring longitudinal acceleration exerted on a vehicle body and producing a longitudinal acceleration indicative signal, and said fourth means is responsive to said longitudinal acceleration indicative signal representative of said longitudinal acceleration being greater than a predetermined longitudinal acceleration criterion for producing said second control signal for ordering said four-wheel drive mode of said power train control system.

9. An anti-skid brake control system as set forth in claim 8, wherein said fourth means derives a wheel acceleration signal and is responsive to said wheel acceleration signal decreasing across a predetermined wheel deceleration threshold for initiating a skid cycle for controlling said operation mode of each of said pressure control valve means according to a predetermined schedule, and said fourth means operates in a normal arithmetic mode for deriving vehicle body speed representative data from a value corresponding to said wheel speed indicative signal value and a skid control state arithmetic value so as to select said normal arithmetic mode when said wheel acceleration signal is maintained greater than or equal to said threshold value and to select said skid control state arithmetic mode otherwise.

10. An anti-skid brake control system as set forth in claim 9, wherein said fourth means compares said wheel acceleration signal with a predetermined threshold value so as to select said normal arithmetic mode when said wheel acceleration signal is maintained greater than or equal to said threshold value and to select said skid control state arithmetic mode otherwise.

11. In a combination of an anti-skid brake control system for controlling braking pressure for maintaining wheel slippage in the vicinity of a predetermined optimum level and a power train control system for controlling power distribution for primary driving wheels which are permanently coupled to an engine and auxiliary driving wheels which are disconnectably coupled with said engine and operable in a two-wheel drive mode for distributing engine driving torque only to said primary wheels and in a four-wheel drive mode for distributing driving torque to both of said primary and auxiliary wheels, said anti-skid control system comprising:

a plurality of wheel cylinders;
a hydraulic circuit connecting a hydraulic pressure source to a respective wheel cylinder of said plurality of wheel cylinders for generating braking pressure therein;
a plurality of pressure control valve means, each disposed in said hydraulic circuit, for operating to increase said braking pressure in an associated one of said wheel cylinders in a first mode and to decrease said braking pressure in said associated one of said wheel cylinders in a second mode;
a plurality of first sensor means, each monitoring rotation speed of an associated one of said primary and auxiliary wheels with which said wheel cylinder is associated to produce a wheel speed indicative signal;
second sensor means for monitoring longitudinal acceleration exerted on a vehicle body for producing a longitudinal acceleration indicative signal;
first arithmetic means for providing a predetermined offset value to said longitudinal acceleration indicative signal to produce an offset longitudinal acceleration indicative signal and integrating said offset longitudinal acceleration indicative signal for deriving wheel speed deceleration magnitude indicative data, and subtracting said wheel speed deceleration magnitude indicative data from an initial value which corresponds to a wheel speed indicative signal value at a beginning of each skid control cycle for deriving vehicle body speed representative data; and
second arithmetic means for controlling said pressure control valve means in a first mode for placing said pressure control valve means in a first position and in a second mode for placing said pressure control valve means in a second position, said second arithmetic means deriving a first control signal for selecting said first and second mode on the basis of said wheel speed indicative signal and said vehicle body speed representative data so as to maintain wheel slippage within a predetermined range, said second arithmetic means detecting wheel slippage greater than a predetermined wheel slippage criterion for producing a second control signal for controlling said power train control system to set said operation mode at said four-wheel drive mode.

12. An anti-skid brake control system as set forth in claim 11, which further comprises third means responsive to said longitudinal acceleration indicative signal representative of longitudinal acceleration criterion for producing said second control signal for ordering said four-wheel drive mode of said power train control system.

13. An anti-skid brake control system as set forth in claim 12, wherein said third means derives a wheel acceleration signal and is responsive to said wheel acceleration decreasing across a predetermined wheel deceleration threshold for initiating a skid cycle for controlling said modes of said pressure control valve means according to a predetermined schedule, and said third means operates in a normal arithmetic mode for deriving said vehicle body speed representative data from a value corresponding to said wheel speed indicative signal value and a skid control state arithmetic mode for deriving said vehicle body speed on the basis of said initial value and said integrated value of said offset longitudinal acceleration indicative value in said skid cycle.

14. An anti-skid brake control system as set forth in claim 13, wherein said third means compares said wheel acceleration signal with a predetermined threshold value so as to select said normal arithmetic mode when said wheel acceleration signal is maintained greater than or equal to said threshold value and to select said skid control state arithmetic mode otherwise.

15. An anti-skid brake control system as set forth in claim 14, wherein said first arithmetic means operates in a normal arithmetic mode for deriving said vehicle body speed representative data from a value corresponding to said wheel speed indicative signal value and a skid control state arithmetic mode for deriving said vehicle body speed on the basis of said initial value and said integrated value of said offset longitudinal acceleration indicative value in said skid cycle.

16. An anti-skid brake control system as set forth in claim 15, wherein said first means derives a wheel acceleration and compared said wheel acceleration with a predetermined threshold value so as to select said normal arithmetic mode when said wheel acceleration is maintained greater than or equal to said threshold value and to select said skid control state arithmetic mode otherwise.

17. An anti-skid brake control system as set forth in claim 16, wherein said first means further compares said vehicle body speed representative data and said wheel speed indicative signal value so as to permit said normal arithmetic mode operation when said wheel speed indicative signal value is greater than or equal to said vehicle body speed representative data.

18. In a combination of an anti-skid brake control system for controlling braking pressure for maintaining wheel slippage in the vicinity of a predetermined optimum level and a power train control system for controlling power distribution for primary driving wheels which are permanently coupled to an engine and auxiliary driving wheels which are disconnectably coupled with said engine and operable in a two-wheel drive mode for distributing engine driving torque only to said primary wheels and in a four-wheel drive mode for distributing driving torque to both of said primary and auxiliary driving wheels, said anti-skid brake control system comprising:

a braking circuit connecting a pressurized fluid source to wheel cylinders for each of said primary and auxiliary wheels for building up brake pressure in the latter;

a plurality of pressure control valve means, each disposed in said braking circuit, for controlling braking pressure in an associated one of said wheel cylinders, each of said pressure control valve means being operable for increasing braking pressure in said associated one of said wheel cylinders in a first mode and decreasing braking pressure in said associated one of said wheel cylinders in a second mode;

first sensors, each monitoring rotation speed of an associated one of primary and auxiliary driving wheels for producing a wheel speed indicative signal;

a second sensor for monitoring longitudinal acceleration exerted on a vehicular body and producing a longitudinal acceleration indicative signal;

second means for deriving wheel slippage on the basis of said wheel speed indicative signal and producing wheel slippage data with respect to each said wheel;

third means for producing a first control signal for controlling an operation mode of each of said pressure control valve means independently of other value means for switching said operation mode between said first and second mode in order to maintain wheel slippage at each said wheel in the vicinity of said predetermined optimum value, on the basis of said wheel slippage data; and fourth means, active while said third means is active, for detecting wheel slippage at said primary driving wheels greater than a predetermined wheel slippage criterion, and responsive to said longitudinal acceleration indicative signal for detecting a low road surface friction level on the basis of said longitudinal acceleration indicative signal for controlling said power train control system to set said operation mode at said four-wheel drive mode when both of wheel slippage greater than said wheel slippage criterion and said low road friction are detected.

* * * * *